United States Patent [19]

Graves et al.

[11] Patent Number: 5,212,568
[45] Date of Patent: May 18, 1993

[54] METHOD AND APPARATUS FOR SCANNING A SIGNATURE DOCUMENT

[75] Inventors: James R. Graves, Ontario; Gerald L. Coy, Rochester; William A. Blitz, Webster, all of N.Y.

[73] Assignee: Xerox Corporation, Stamford, Conn.

[21] Appl. No.: 583,922

[22] Filed: Sep. 17, 1990

[51] Int. Cl.$^5$ .................................. H04N 1/40
[52] U.S. Cl. ........................ 358/474; 358/449; 358/453; 358/488; 355/233
[58] Field of Search ............. 358/474, 496, 498, 486, 358/449, 451, 452, 453, 488, 497; 355/1, 51, 57, 65, 233, 234, 235

[56] References Cited

U.S. PATENT DOCUMENTS

| | | | |
|---|---|---|---|
| 3,994,580 | 11/1976 | Hoffman | 355/51 |
| 4,103,991 | 8/1978 | Kramer | 355/51 |
| 4,324,485 | 4/1982 | Asakura et al. | 355/235 |
| 4,334,765 | 6/1982 | Clark | 355/14 SH |
| 4,353,638 | 10/1982 | Knechtal | 355/8 |
| 4,611,908 | 9/1986 | Buch | 355/55 |
| 4,659,207 | 4/1987 | Maekawa | 355/8 |
| 4,674,864 | 6/1987 | Stakenborg et al. | 355/14 |
| 4,688,930 | 8/1987 | Ohno | 355/25 |
| 4,731,637 | 3/1988 | Acquaviva et al. | 355/14 SH |
| 4,739,372 | 4/1988 | Watanabe | 355/25 |
| 4,743,946 | 5/1988 | Nishimori et al. | 355/214 |
| 4,752,809 | 6/1988 | Ito | 355/243 |
| 4,783,682 | 11/1988 | Maekawa | 355/14 SH |
| 4,837,636 | 6/1989 | Daniele et al. | 358/300 |
| 4,908,664 | 3/1990 | Ogura | 355/235 |
| 5,057,869 | 10/1991 | Graves et al. | 355/233 |
| 5,119,206 | 6/1992 | Rourke et al. | 358/453 |

FOREIGN PATENT DOCUMENTS

| | | | |
|---|---|---|---|
| 3635964 | 5/1988 | Fed. Rep. of Germany | 355/14 C |
| 2-146569 | 8/1990 | Japan | |

Primary Examiner—Edward L. Coles, Sr.
Assistant Examiner—Jerome Grant, II
Attorney, Agent, or Firm—Duane C. Basch; Ronald F. Chapuran

[57] ABSTRACT

An electronic reprographic apparatus, including a method for increasing the speed of manual or semi-automatic imaging of signature-type original documents, having the ability to selectively control the areas of the documents to be imaged. In particular, the system enables the user to identify the type of input document, including size and image cropping dimensions, thereby eliminating the potential for imaging beyond document edges or in bound document gutter regions. In addition, the system is suitable for scanning both page sides of a first signature-type document on the first pass of the scan array and is capable of scanning a second signature-type document on the reverse or return pass. Furthermore, the system implements the scanning operation with a center registration technique, facilitating the registration of bound documents.

13 Claims, 19 Drawing Sheets

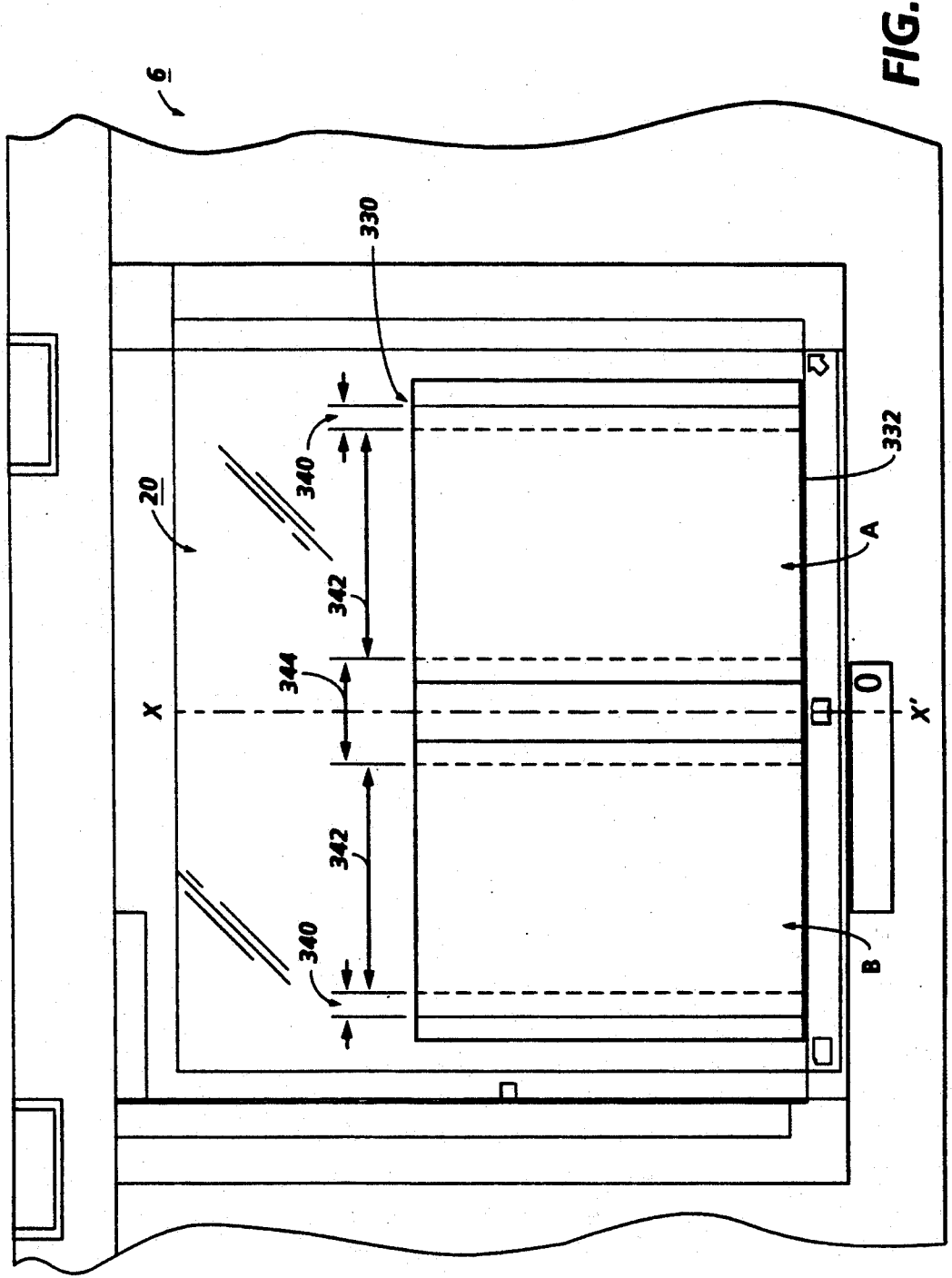

METHOD AND APPARATUS FOR SCANNING A SIGNATURE DOCUMENT

BACKGROUND OF THE INVENTION

1. Field of the Invention

The invention relates generally to an electronic reprographic system, and more specifically to the method and apparatus for electronically scanning a bound document or other signature-type input documents.

2. Description of the Prior Art

As is well known, a signature-type document is a sheet typically containing four numbered pages which when folded and nested inside one another become one unit of a pamphlet or book. Generally, in order to obtain an electronic image of a plurality of bound or signature-type pages, it is necessary to scan each of the pages independently. Furthermore, scanning the facing page requires the manual repositioning of the book or document to a fixed registration position prior to initiating the scanning operation.

In general, formation of a single copy sheet from two sheets or pages placed on the platen is known in the reprographic art. For example, U.S. Pat. No. 4,731,637 to Acquaviva et al. discloses a registration gate which is retractably insertable having first and second registration sides spaced apart by a preset defined distance. Documents are fed to an imaging station for "two-up" copying with a registered spacing between them determined by a gate thickness. U.S. Pat. No. 4,334,765 to Clark also teaches an apparatus comprising an automatic document feeder in which copies may be reduced in size and placed contiguous one another on both sides of a copy sheet in a sequence facilitating booklet assembly. Also, U.S. Pat. No. 4,783,682 to Maehara discloses a method which comprises correctly aligning a tip position of a copy paper by operating a timer and a counter. When "one-set/two-copy" mode is entered for continuously copying, both a left half and a right half of a two sided original are copied onto individual copying papers. Moreover, an apparatus capable of copying a bound document while eliminating the offset inherent in the copy of the second page is taught in U.S. Pat. No. 4,739,372 to Watanabe. The image forming apparatus disclosed provides dual-page copies of a document that are free of offset. Also included is a fixed scale that provides a scanning start position for the first page of a document, and a movable scale that provides a scanning end position for a second page of a document. U.S. Pat. No. 4,674,864 to Stackenborg et al. also teaches a device having control means for accepting data concerning the width of oppositely located image-free edge zones, whereby said control means ultimately determines the imaging ratio and a final width of the image-free edge zones. An operator need not reinput these data for each copying job.

Another example of a reprographic apparatus intended to facilitate copying a book is found in U.S. Pat. No. 4,659,207 to Maekawa, which discloses a method comprising a switchable mode enabling the starting of an exposure from either one end or the center of a glass platen according to an operation signal. Copies are formed on both sides of a copy paper or on two different copy papers selectively. Moreover, U.S. Pat. No. 4,353,638 to Knechtel discloses an apparatus which produces copies during a forward scanning time and a backward scanning time. During backward scanning, a reflector is interposed in the optical path to further reflect and invert the image exposed on the photoconductive drum. Also, U.S. Pat. No. 4,688,930 to Ohno discloses an original reading apparatus which separately scans a first area and a second area of an original. In a first scanning mode, an optical scanning device first scans a first area of an original and automatically scans sequentially a second area of an original, and vice versa. Moreover, U.S. Pat. No. 4,611,908 to Bush also teaches an apparatus having a means for inputting information on a desired margin size, and in response to this input, an adjustment is made to the location of the reproduced image with respect to the copy sheet.

While the reprographic art presented teaches methods and apparatus for copying books, all appear to be limited to producing output on a standard size copy sheet. Furthermore, because the sheet is of standard size, the copies will generally contain edges that are darkened due to the exposure of the binding region of the book. Generally, the only recourse, for eliminating the effects of the binding region, is to alter the registration of the book and/or magnify the image to fill a greater portion of the copy sheet.

Fortunately, electronic reprographic systems enable the selective scanning of only a predetermined region of an original document. It would be desirable therefore to implement a new and improved system for bound or signature document image scanning utilizing the selective scanning or cropping capabilities of an electronic reprographic system. It is another object of the present invention to provide a simplified method for the operator to select such a scanning mode. It is a further object of the present invention to simplify the operation of registering the bound document on the imaging platen. It is yet another object of the present invention to increase the speed of scanning signature-type documents by scanning the two facing pages of a signature sheet in one scanning pass. It is yet another object of the present invention to decrease the interdocument scanning delay of such a scanning system by scanning both facing pages of a signature sheet in a first direction, indexing a second signature sheet onto the imaging platen and scanning both faces of the second signature sheet in a direction opposite the first direction. It is a final object of the present invention to further decrease the system interdocument delay time while improving document registration by sequentially feeding and registering unbound signature sheets to the imaging platen.

Further advantages of the present invention will become apparent as the following description proceeds and the features characterizing the invention will be pointed out with particularity in the claims annexed to and forming a part of this specification.

SUMMARY OF THE INVENTION

Briefly, the present invention is a method for increasing the speed of manual or semi-automatic imaging of signature-type original documents, including the ability to selectively control the areas of the documents to be imaged. In particular, the system enables the user to identify the type of input document, including size and image cropping dimensions, thereby eliminating the potential for imaging beyond document edges or in bound document gutter regions. Furthermore, the system implements the scanning operation with a center registration technique, facilitating the registration of bound documents.

BRIEF DESCRIPTION OF THE DRAWINGS

For a better understanding of the present invention, reference may be had to the accompanying drawings wherein the same reference numerals have been applied to like parts and wherein:

FIG. 15 is a plan view of the platen and document of FIG. 14, showing the registration of the document in the open platen mode.

DESCRIPTION OF THE PREFERRED EMBODIMENT

Figure 1:
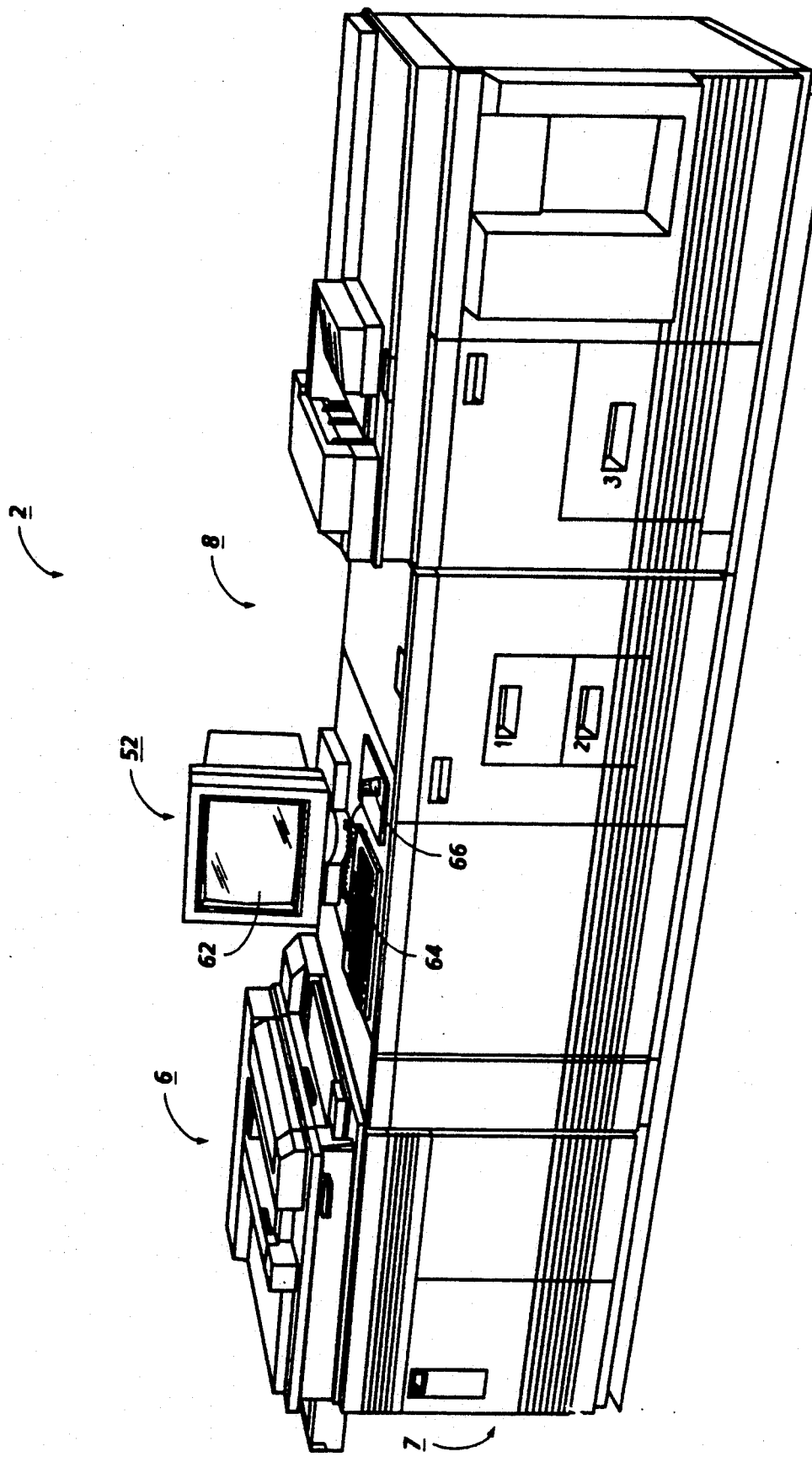
FIG. 1 is a view depicting an electronic printing system incorporating the present invention.
Figure 2:
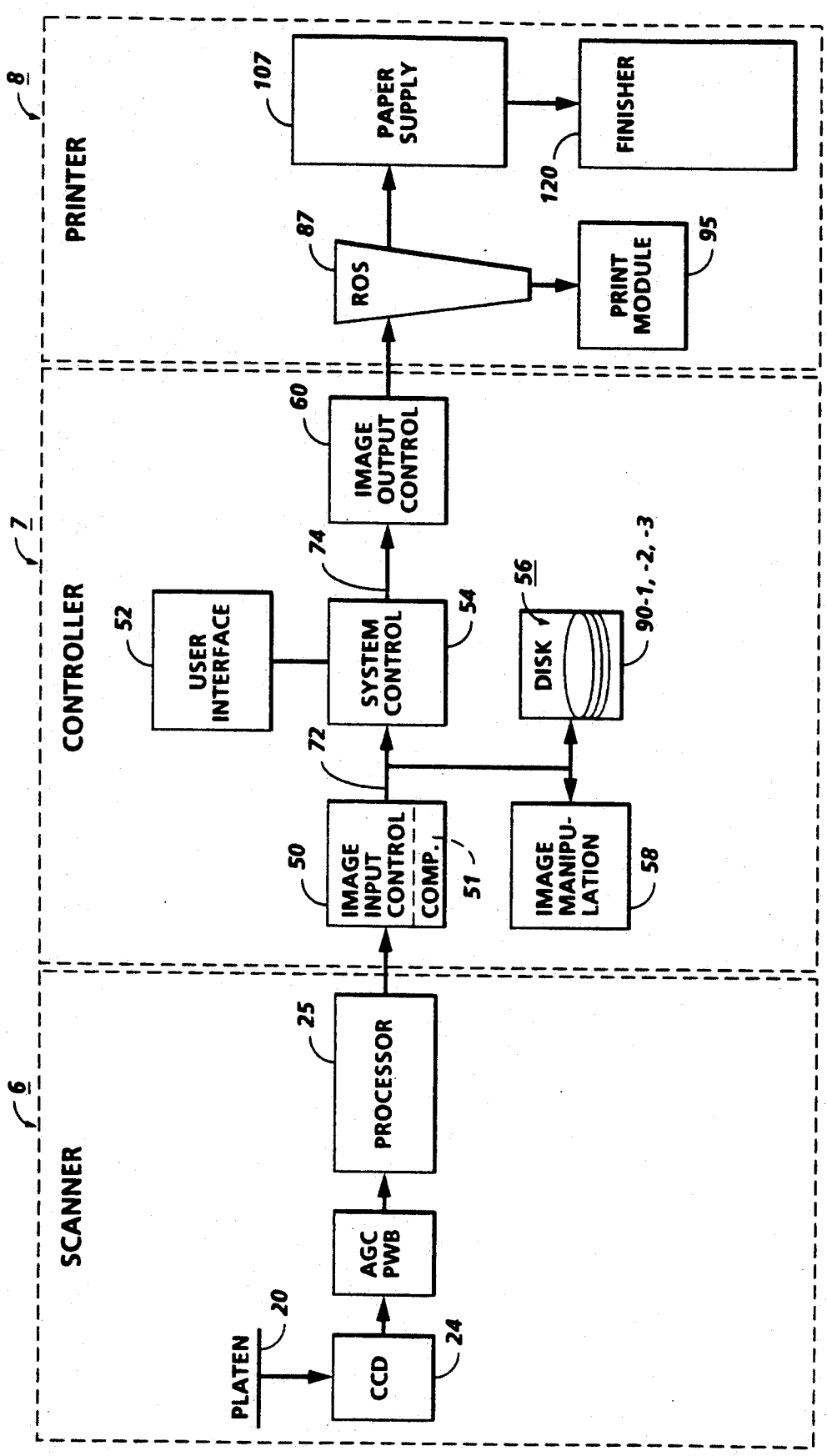
FIG. 2 is a block diagram depicting the major elements of the printing system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
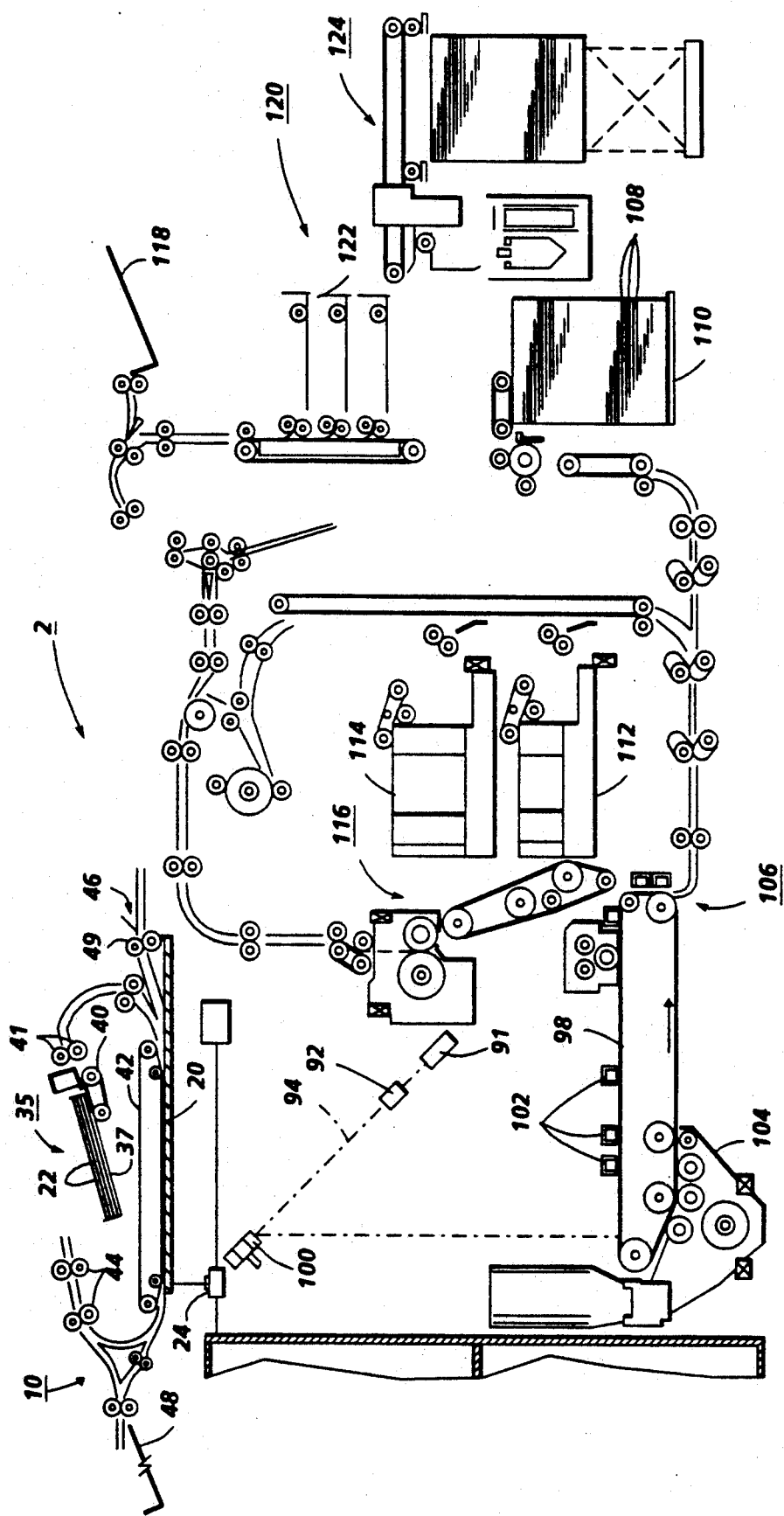
FIG. 3 is a plan view illustrating the principal mechanical components of the printing system shown in FIG. 1.
Figure 4:
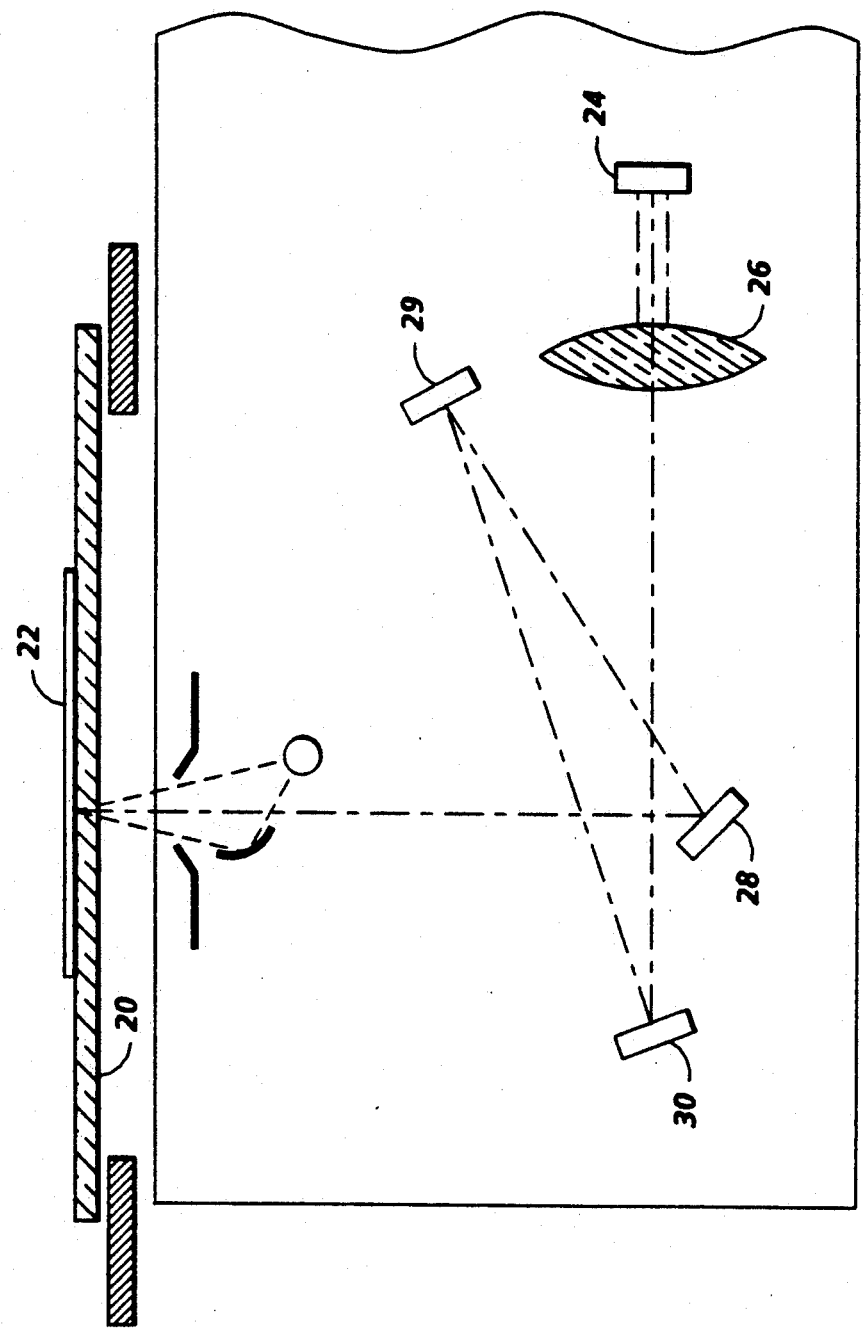
FIG. 4 is a schematic view showing certain construction details of the document scanner.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line like segment of platen 20 and the document being scanned thereon. Array 24 provides image signals or pixels representative of the image scanned which after suitable processing by processor 25, are output to controller section 7.

Processor 25 converts the analog image signals output by array 24 to digital image signals and processes these signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 95 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108, as will appear, may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stacker with stitcher 122 for stitching or stapling the prints together to form books and a thermal binder 124 for adhesively binding the prints into books.

Referring to FIGS. 1, 2 and 5A-5C, controller section 7 is, for explanation purposes, divided into an image input controller 50, User interface (U/I) 52, system controller 54, main memory 56, image manipulation section 58, and image output controller 60.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, U/I 52 includes a combined operator controller/CRT display consisting of an interactive touchscreen 62, keyboard 64, and mouse 66. U/I 52 interfaces the operator with printing system 2, enabling the operator to program print jobs and other instructions, to obtain system operating information, instructions, programming information, diagnostic information, etc. Following programming and scanning in of the documents that comprise a job, the job data is placed in a job file (shown in FIG. 13). Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of U/I 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc are carried out. Following processing, the data may be returned to main memory 56, sent to U/I 52 for display on touchscreen 62, or sent to image output controller 60.

Figure 5A:
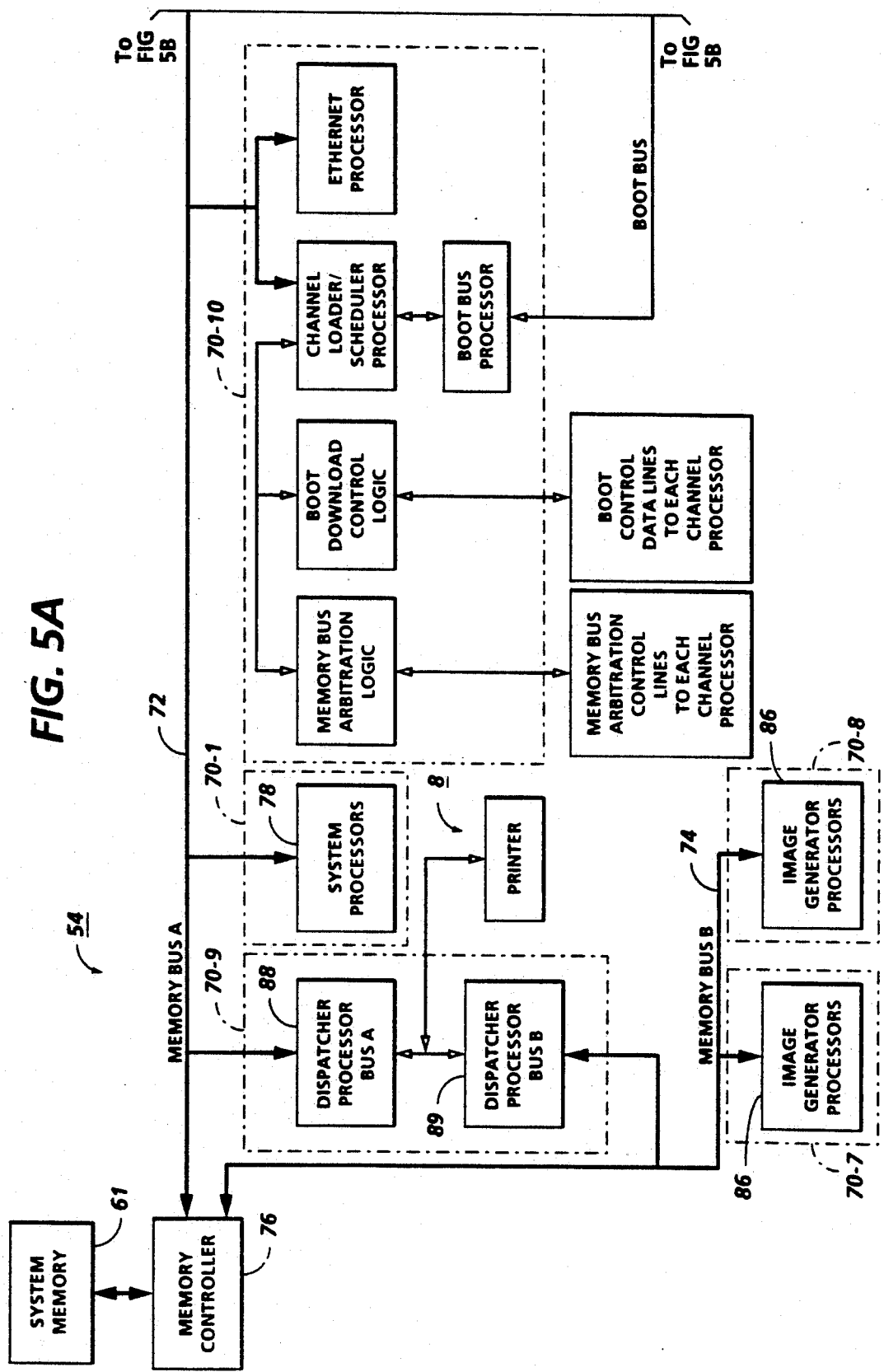
FIGS. 5A-5C comprise a schematic block diagram showing the major parts of the system control section.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 5B:
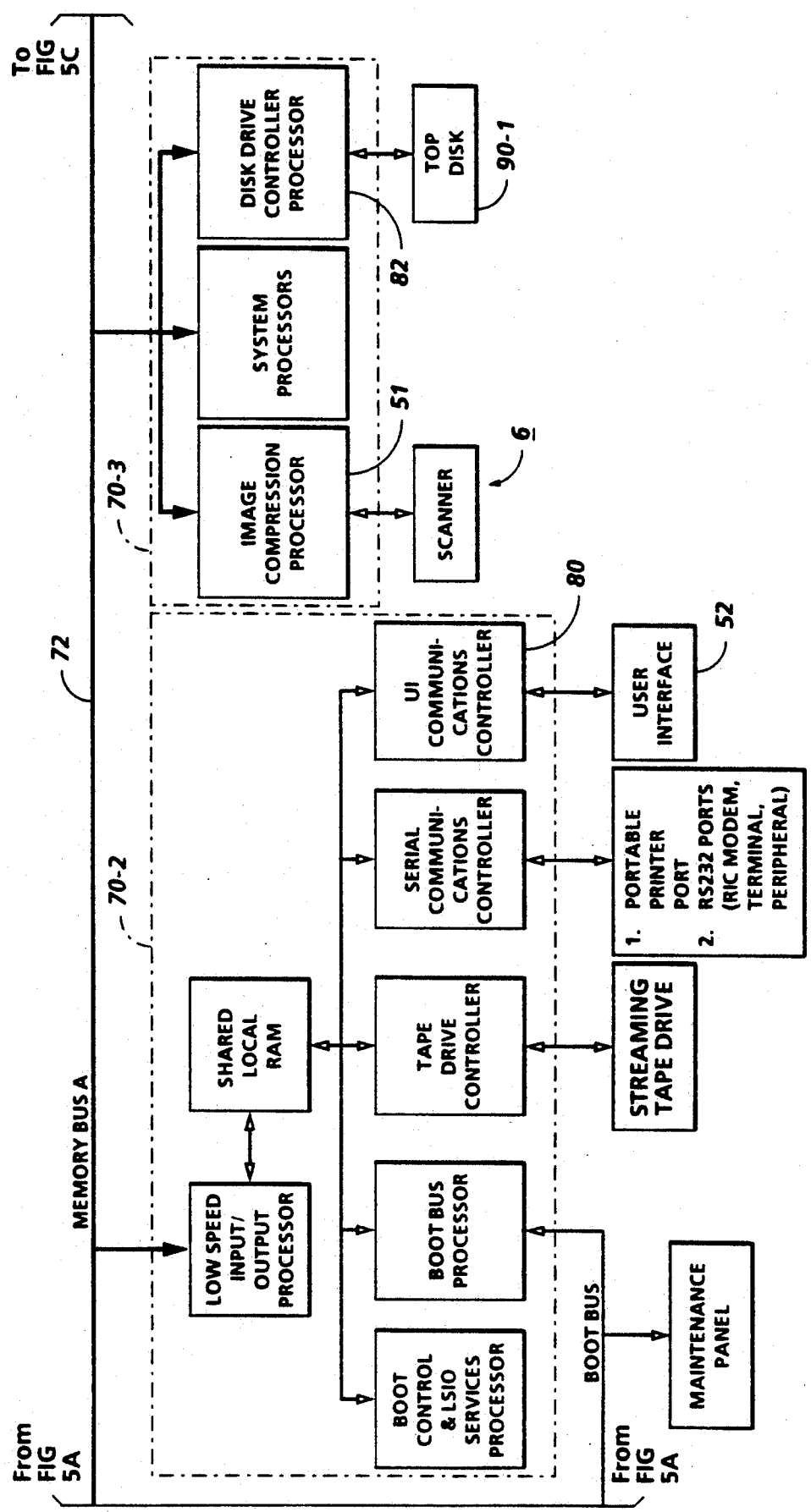
Figure 5C:
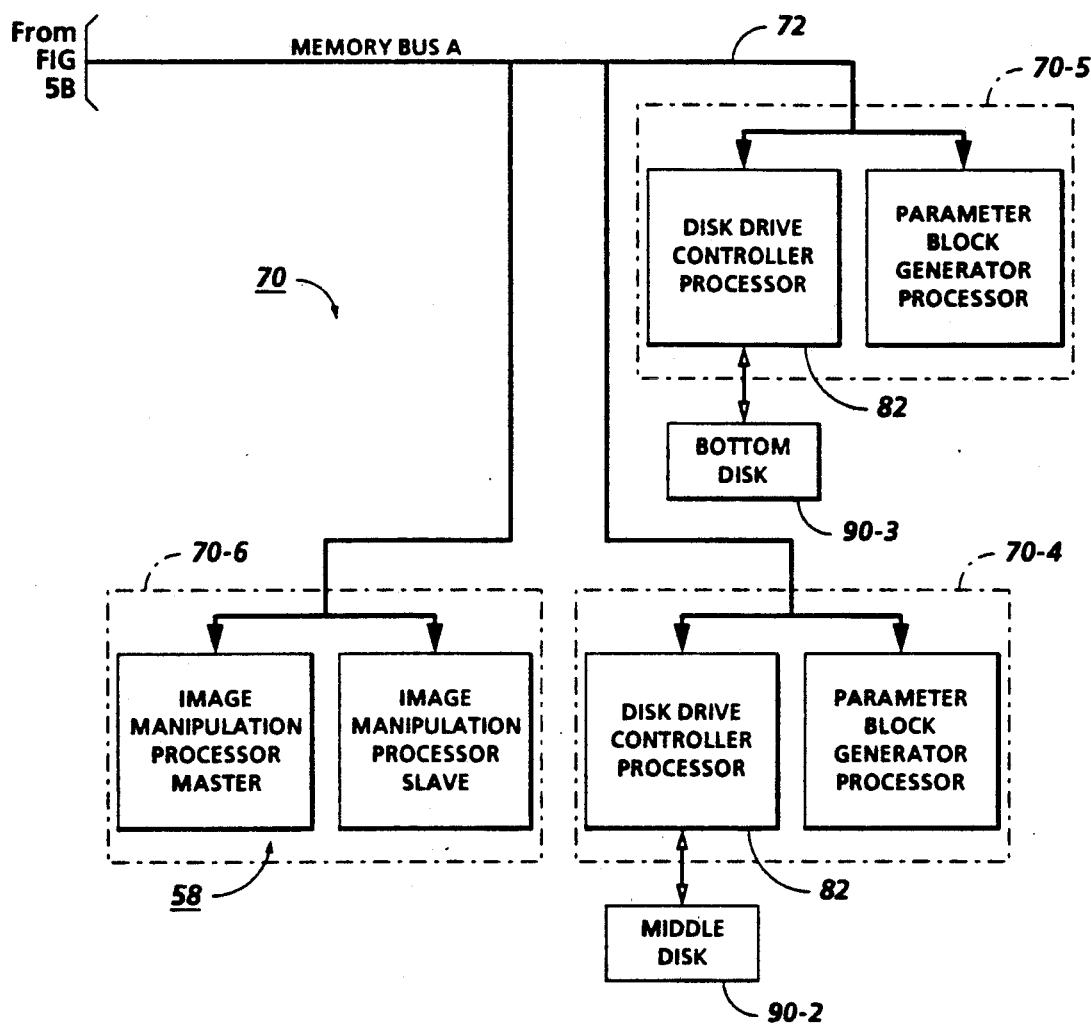

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having U/I communication controller 80 for transmitting data to and from U/I 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Figure 6:
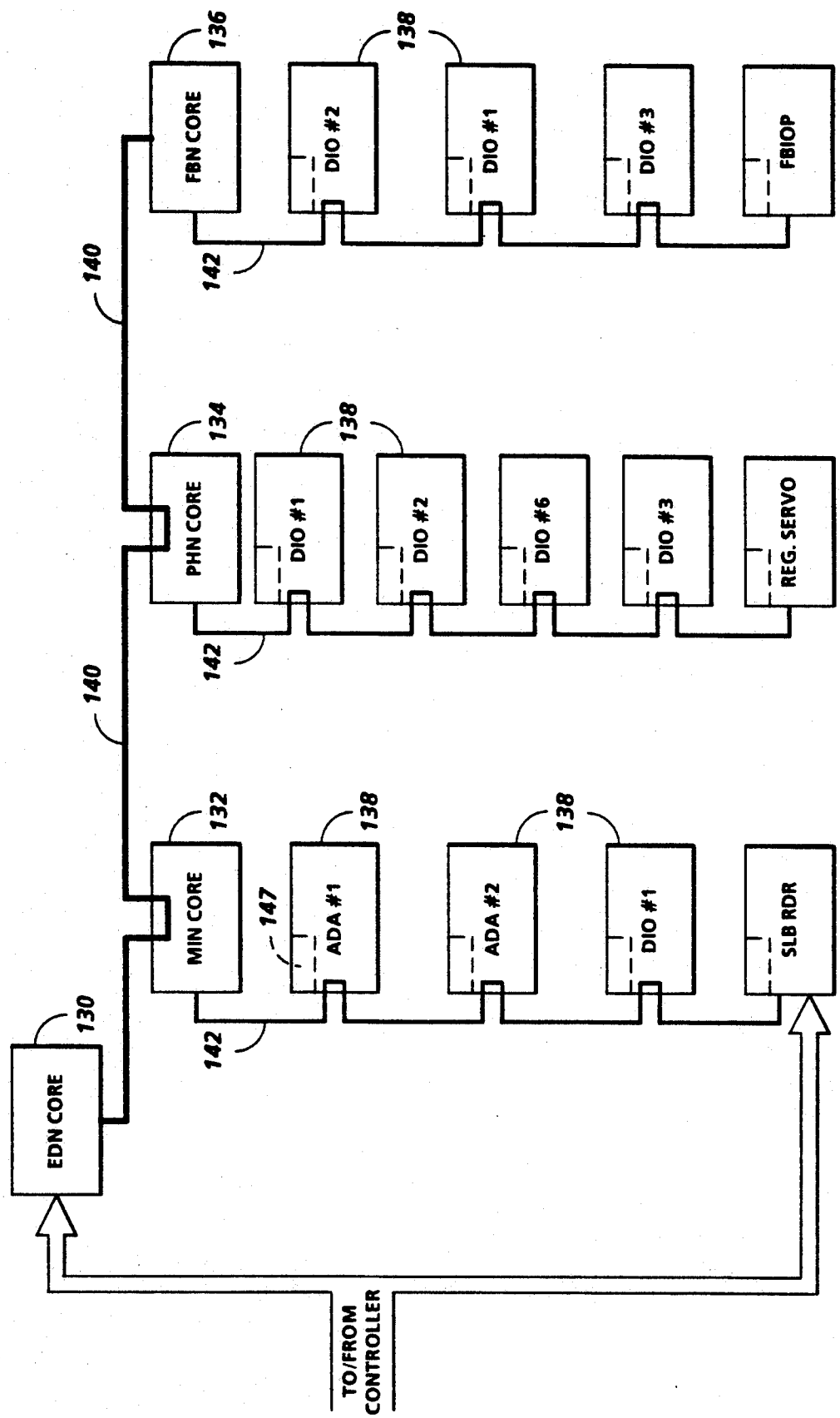
FIG. 6 is a block diagram depicting the Operating System, with Printed Wiring Boards and shared line connections.

Referring particularly to FIG. 6, system control signals are distributed via a plurality of printed wiring boards (PWBS). These include EDN core PWB 130, marking imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Figure 7:
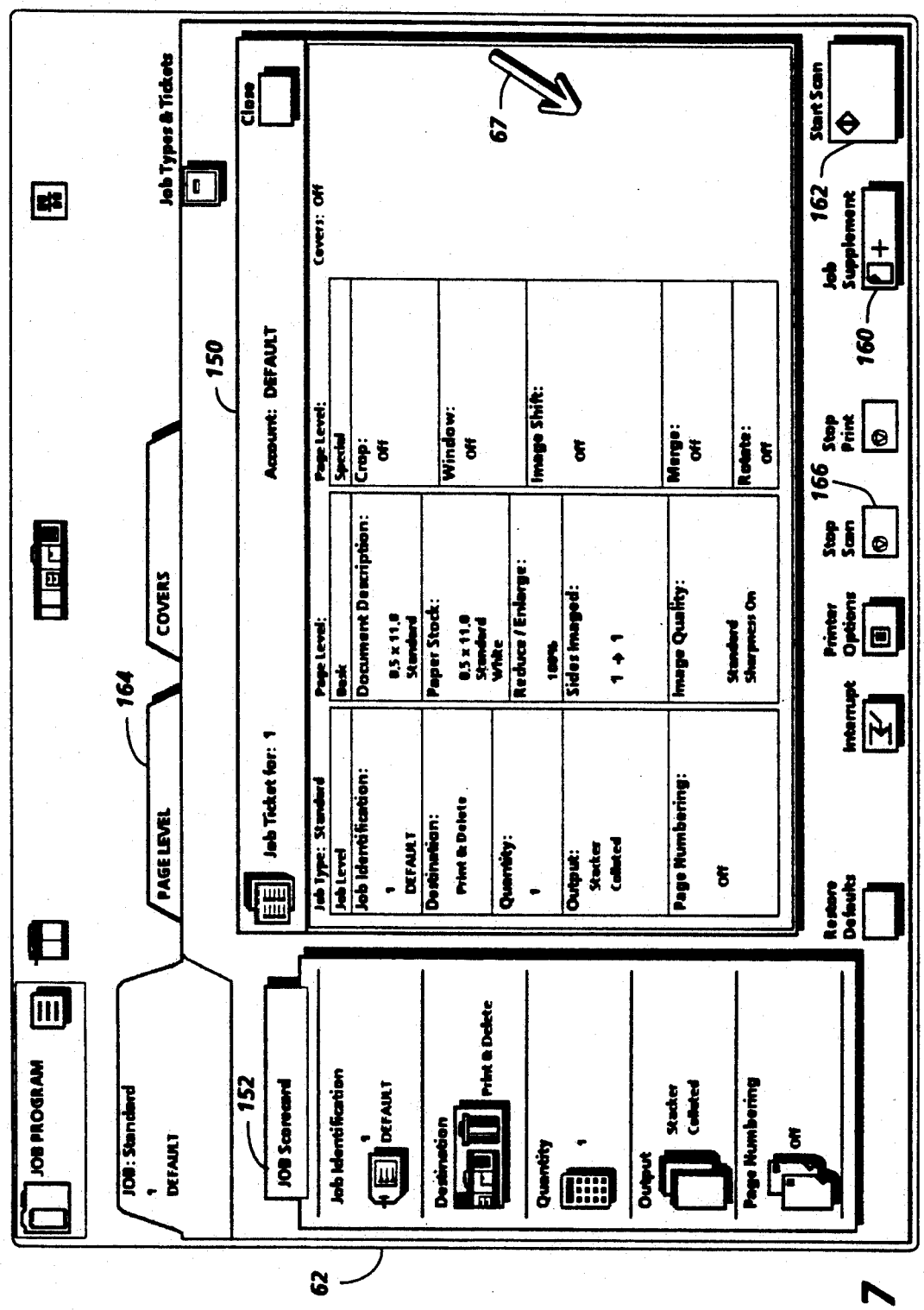
FIG. 7 is a view of the User Interface touchscreen display in the Job Programming mode displaying examples of Job Tickets and Job Scorecards used for programming jobs.

Referring to FIG. 7, jobs are programmed in a Job Program mode in which there is displayed on touchscreen 62 a Job Ticket 150 and a Job Scorecard 152 for the job being programmed. Job Ticket 150 displays the various job selections programmed while Job Scorecard 152 displays the basic instructions to the system for printing the job.

Figure 8A:
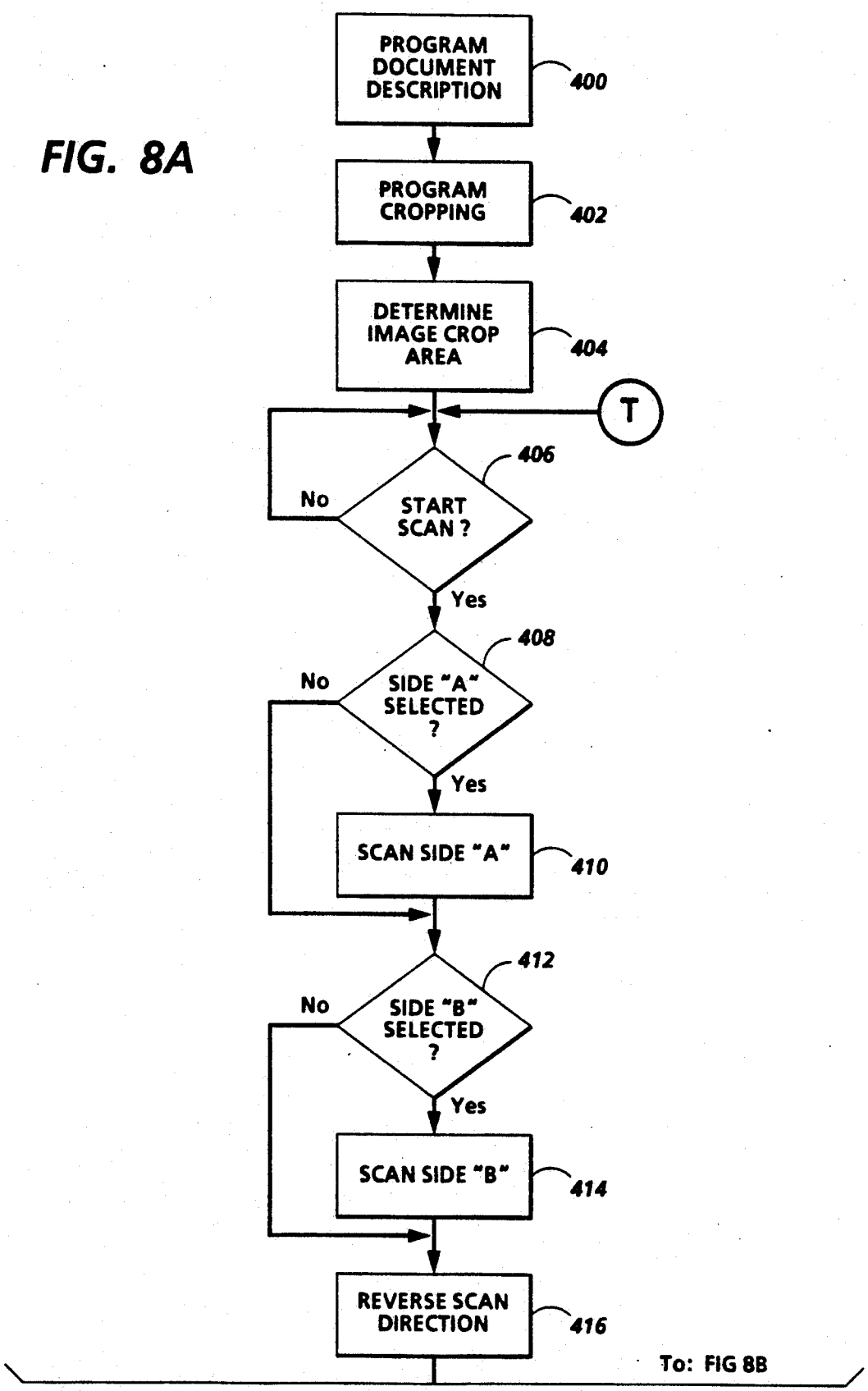
FIGS. 8A and 8B show a flow chart illustrating the processing steps executed by the system of FIG. 1 in accordance with the present invention.
Figure 8B:
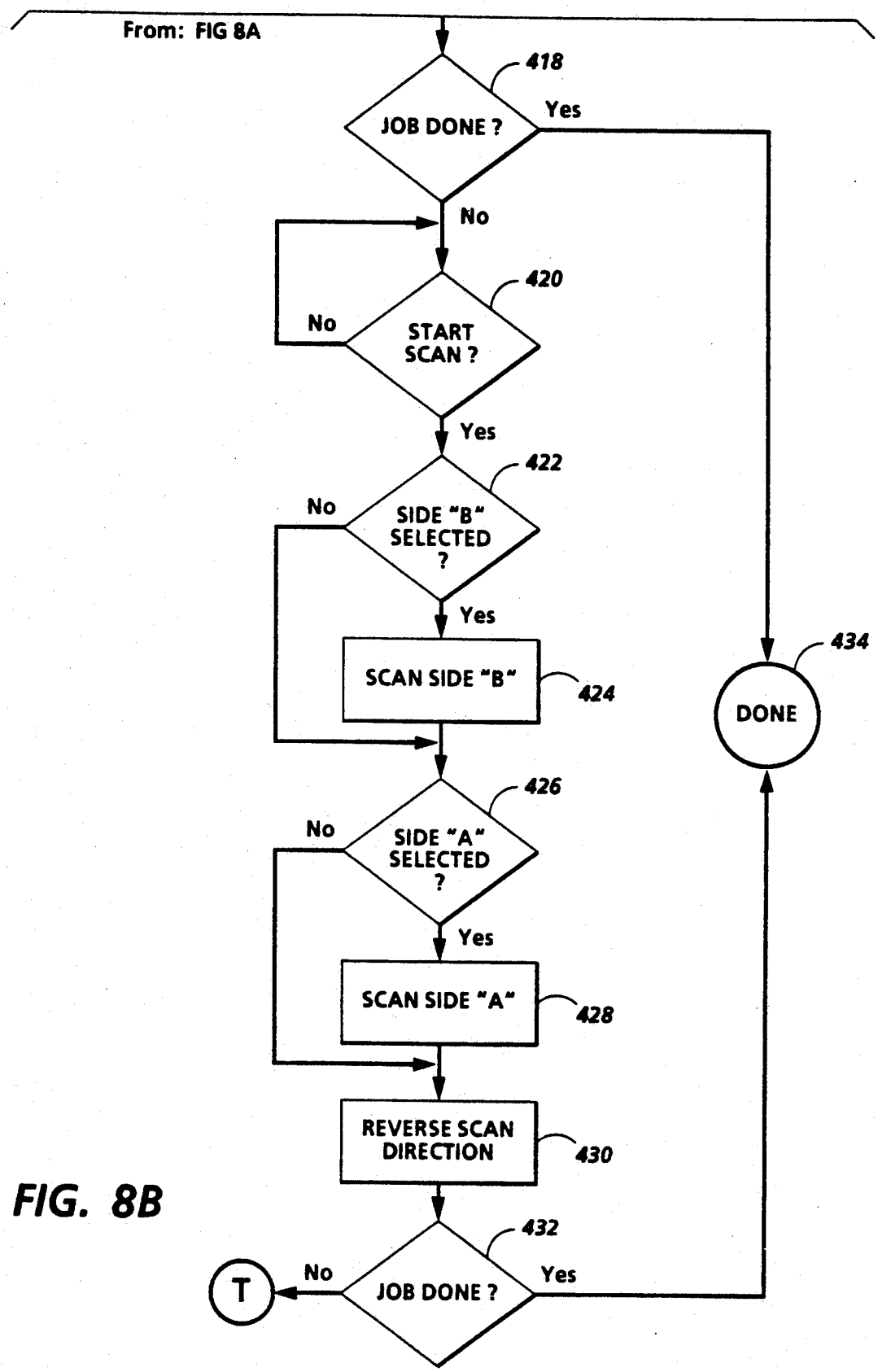
Figure 9:
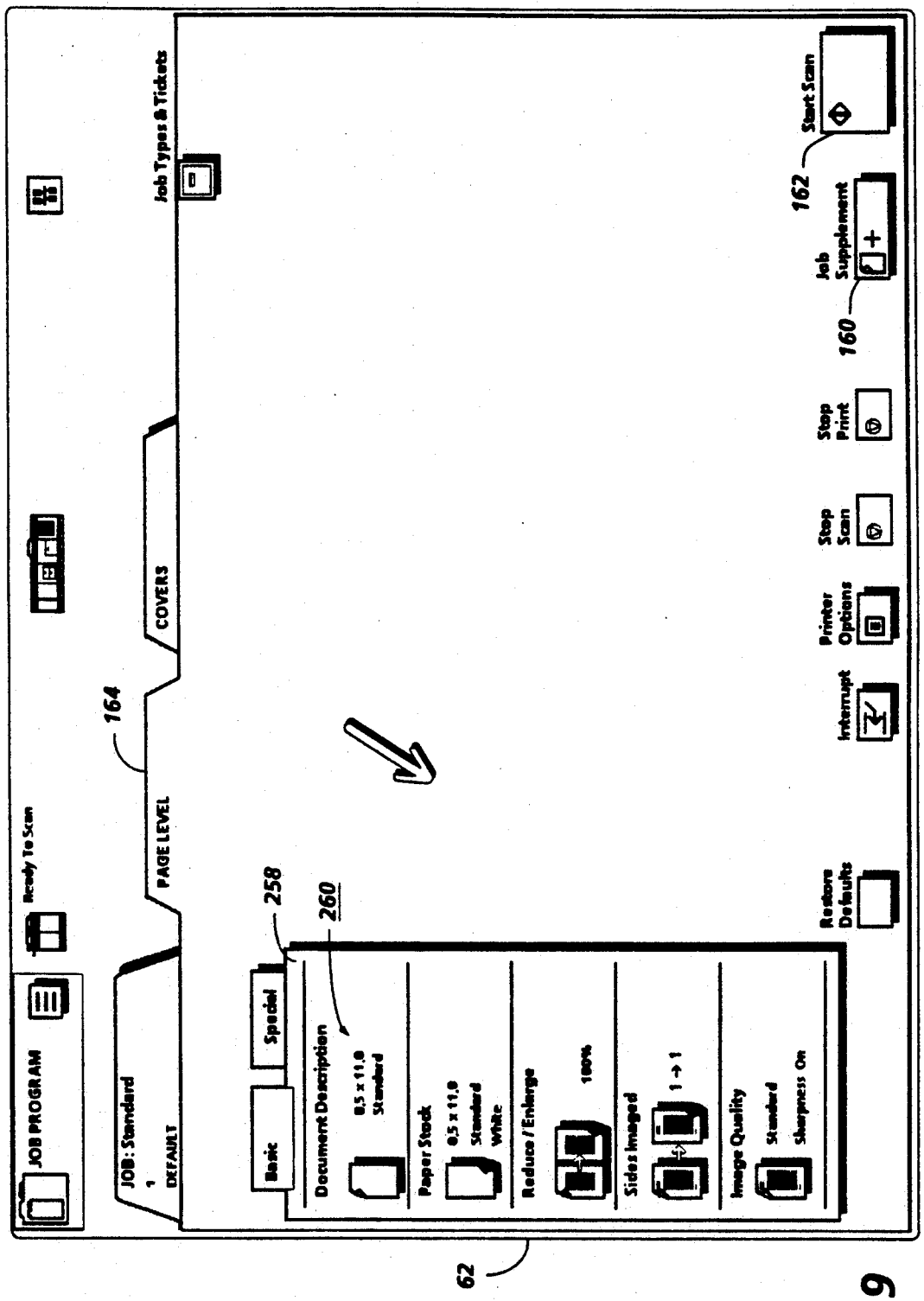
FIGS. 9-13 are additional views of the User Interface touchscreen displaying example screens associated with Document Description and Cropping programming steps of the process illustrated in FIG. 8A.
Figure 10:
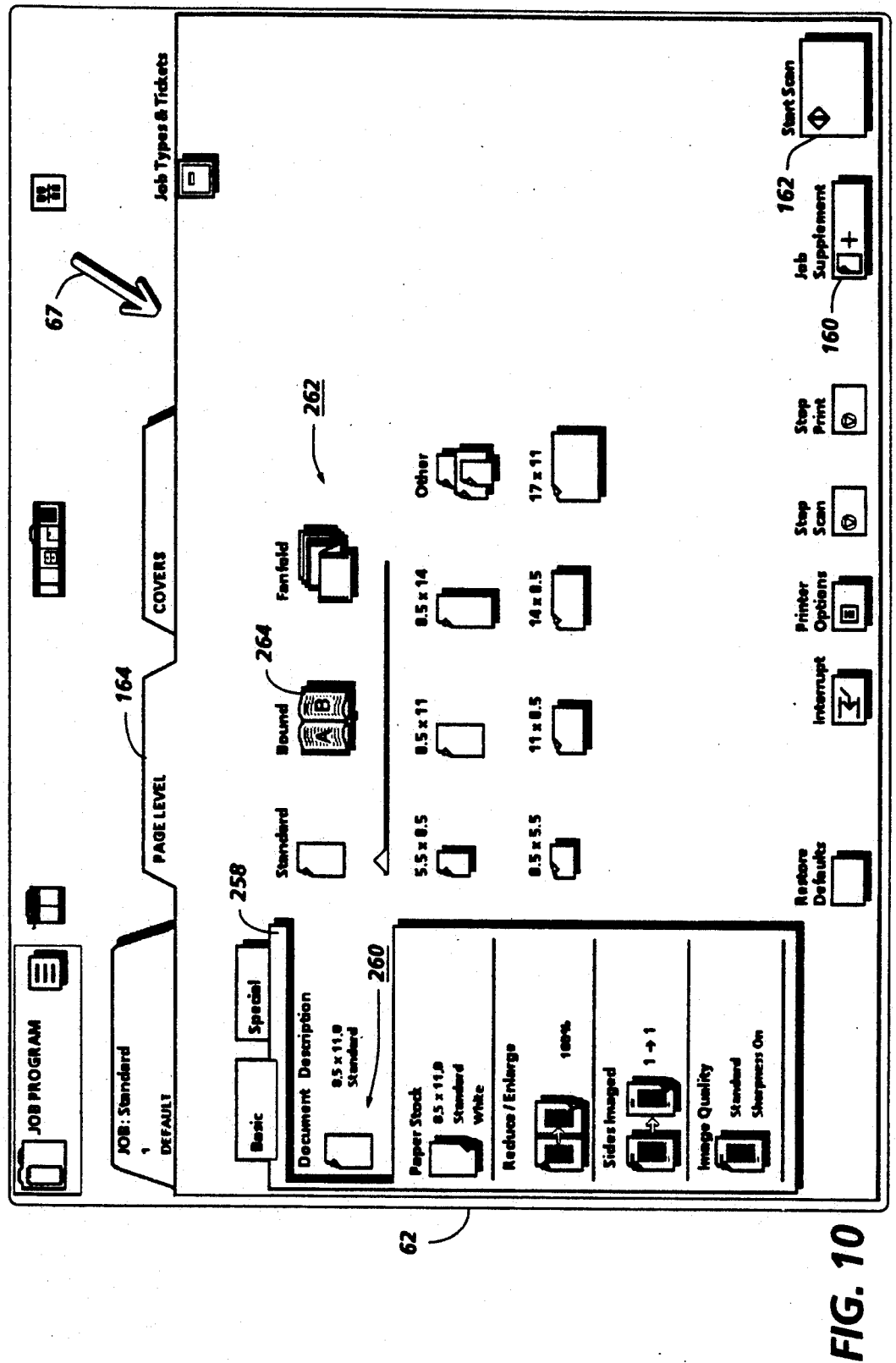

Referring now to FIGS. 8A and 8B, which display the processing steps associated with the present invention as implemented in scanner section 6 and controller section 7 of FIG. 2, the first step in initiating the signature document scanning mode is to program the document description, block 400. The document description programming touchscreen is accessed by first touching PAGE LEVEL tab 164 of FIG. 7. This will subsequently disclose Job Scorecard 258 of FIG. 9. Upon selecting Document Description icon 262 of FIG. 9, touchscreen display 62 will appear as shown in FIG. 10. Referring also to FIG. 10, Document Description icon 260 is highlighted to indicate that Job Ticket area 262 represents the programmed features associated with the input document. In the case of a signature input document, the user would select bound document icon 264 to indicate that the input document contains a pair of pages which face one another. Upon selecting bound document icon 264, the icon would become highlighted and Job Ticket area 262 would be changed to reflect the programming options associated with the bound or signature-type input document selection as illustrated in FIG. 11A.

Figure 11A:
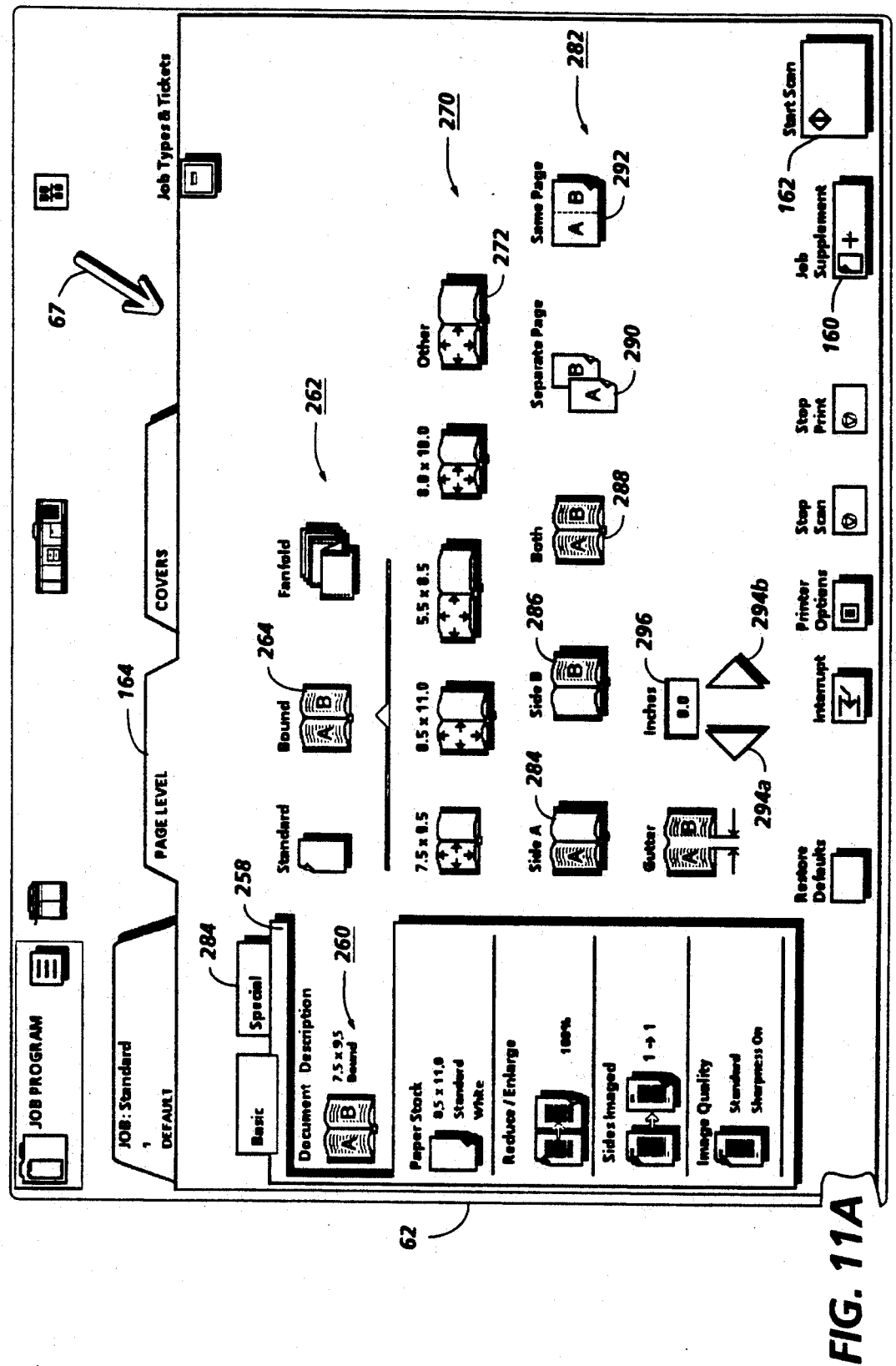
Figure 11B:
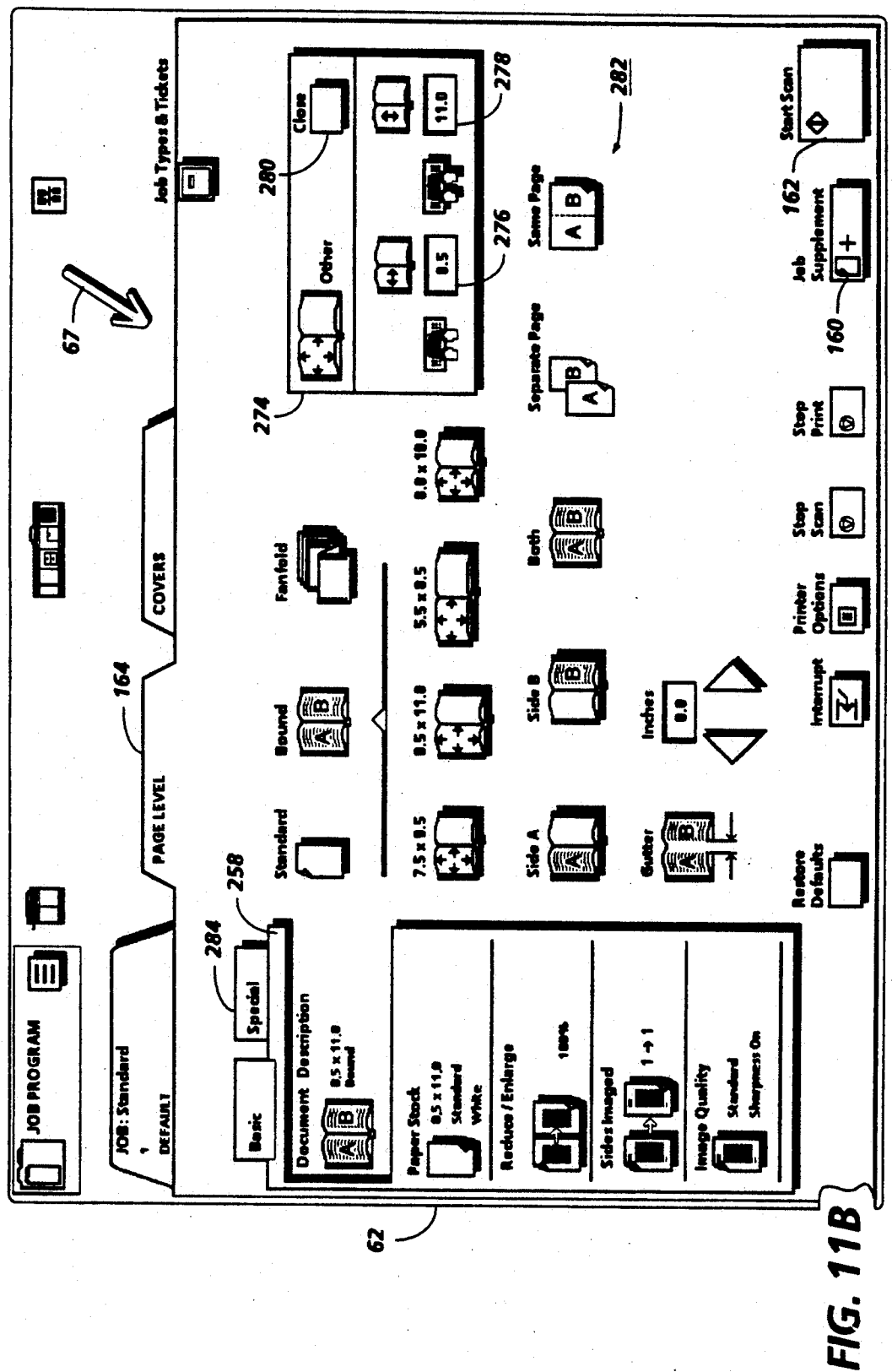

Referring now to FIGS. 11A and 11B, which display the touchscreen associated with the bound input document programming selections, the user is able to specify the size of the input document on icon line 270, in accordance with the actual size of the input document. In addition, if the input document is not one of the standard sizes displayed in the preprogrammed icons, the user may select Other icon 272. Selection of icon 272 causes window 274 of FIG. 11B to appear. Window 274 prompts the operator to enter, via keyboard 64 of FIG.

Figure 14:
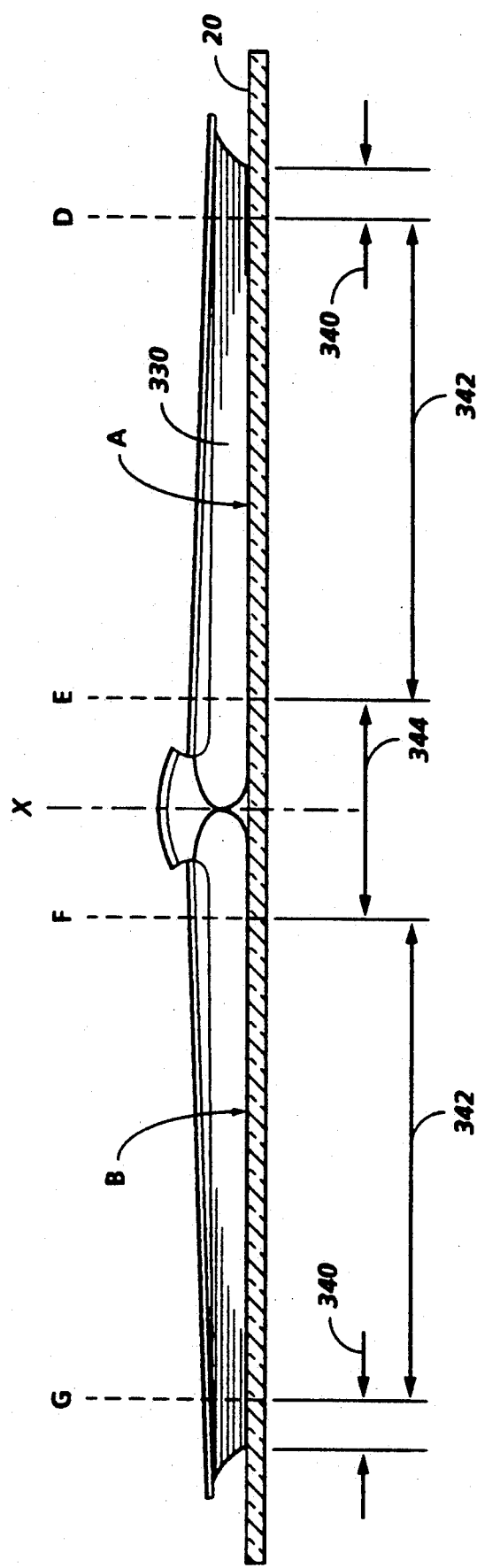
FIG. 14 is a schematic view of the imaging platen with a bound document placed thereon.

1, the actual dimensions of the input document. More specifically, the user enters values associated with page width, display box 276, and page height, display box 278. After entering the correct values, the user completes the sequence by touching the Close button, 280. Generally, any of the touching or selection actions described herein may be accomplished via the known practices of; a) physically touching touchscreen 62, or b) moving cursor 67 to the desired location, by moving mouse 66 of FIG. 1, and depressing one of the mouse buttons to indicate the selection. Icon line 282 contains icons which represent various combinations of sides of the input document which are to be scanned. For example, icons 284 or 286 would be selected to scan only side A or Side B of the input document. Icon 288 would be selected to scan both sides of the document. Furthermore, the user may select either icon 290 or 292 to program the system to separate the pages into two independent pages, icon 290, or to keep the two pages incorporated into one single image, icon 292. Finally, the user may specify the area at the center of the document that is not to be imaged, the gutter region, using make smaller button 294a or make larger button 294b. More specifically, the user scrolls to a value, displayed in window 296, that corresponds to the distance between the inside edge of the image area and the center of the bound region or fold line. For example, if the user scrolls to a gutter value of 0.5 inches, the system will remove a 1.0 inch section from the center of the scanned image, 0.5 inches from both sides. The distance is generally considered the gutter distance and is indicated in FIGS. 14 and 15 by reference numeral 344. Effectively, this value disables the storage of video image signals within the gutter region. In addition, the system controller subsequently utilizes the gutter value for the determination of the maximum image area width.

Figure 12:
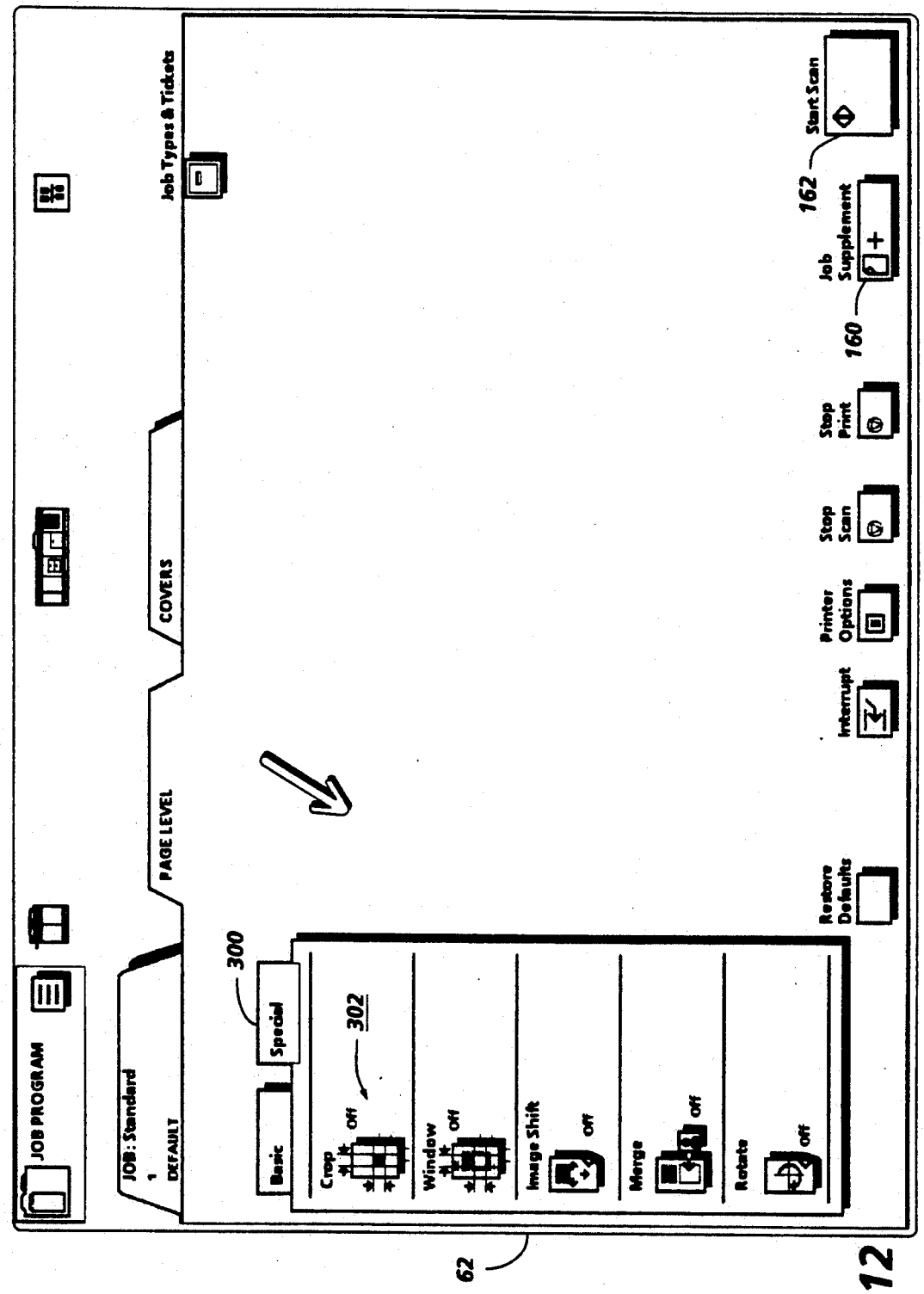
Figure 13:
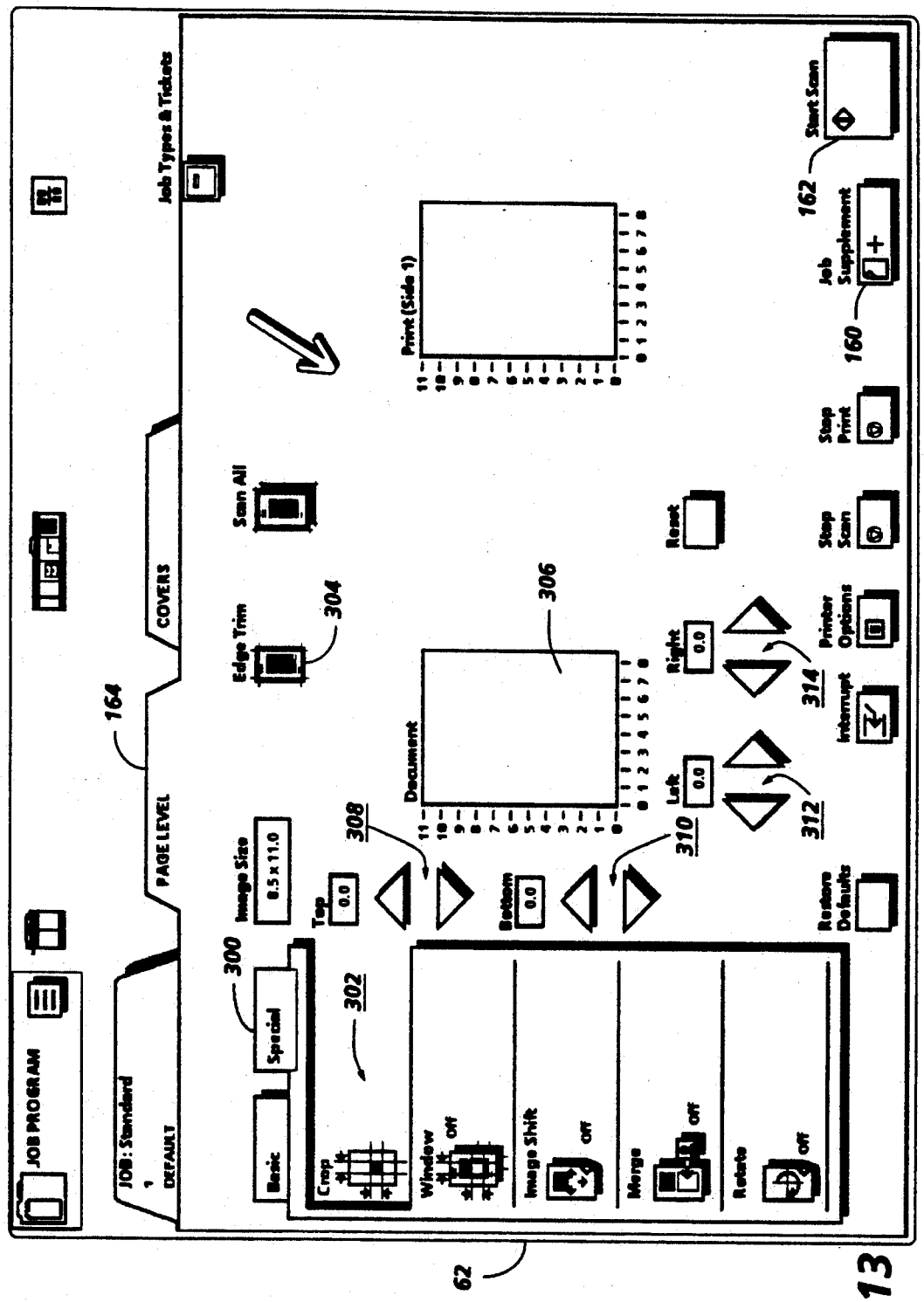

FIG. 12 displays Special Job Scorecard 300, which is accessed by selecting button 284 at the top of Job Scorecard 258 in FIG. 11A. It is an option to further limit the area of the original document page that is to be scanned by selecting Crop icon 302, as shown at block 402 of FIG. 8A. Upon selecting Crop icon 302, U/I 52 will immediately display the touchscreen illustrated in FIG. 13. Referring now to FIG. 13, Crop icon 302 is now highlighted indicative of the selection and the Job Scorecard area is used to illustrate the possible cropping selections available to the user. Specifically, when Edge Trim icon 304 is selected, the U/I displays document frame 306 which indicates the currently selected cropping coordinates as margins. Subsequently, the user may use adjustment button pairs 308, 310, 312 and 314 to adjust the top, bottom, left and right cropping margins, respectively. Adjustment of the image cropping area effectively alters the size of the document that will be scanned, thereby eliminating or cropping the area outside of the specified border. With respect to a bound or signature-type input document, the cropping capability further defines the area of the input document that is to be scanned. For example, the user may utilize the cropping capability to remove non-printed margins that are present along the unbound edges of the input document pages.

Referring also to FIGS. 14 and 15, which respectively display schematic and plan views of imaging platen 20 of FIG. 3, where document 330 has been placed upon the imaging platen. Document 330, illustrated as a bound document, has both an A imaging side and a B imaging side located on two opposing pages of the document. More appropriately, document 330 may be any signature-type document having distinct images formed on a single surface thereof, wherein the images may represent two opposing pages of a signature unit. Document 330 is shown registered in the center of imaging platen 20, along line X-X', in accordance with the present invention, thereby facilitating the registration of any bound document against side registration edge 332 only.

After programming the cropping parameters for the input image, via the touchscreen of FIG. 13, the left margin distance becomes the Crop Offset Distance, 340, for the input document. In addition, the Crop Distance, 342 is determined by subtracting the sum of the left and right margin distances from the document page width as previously described. It should be noted that the cropping parameters have been illustrated and described in the slow scan direction as equivalent for both sides A and B of the input document, for reasons of simplicity of explanation only. Moreover, while the side to side equivalency is a characteristic of the present embodiment, which utilizes this simplified manner of handling the majority of signature-type input documents, it should be appreciated that equivalency of the cropping parameters is not necessarily a limitation of the present invention.

Referring again to FIGS. 8A and 8B in conjunction with FIG. 14, where it is assumed that the operator has previously programmed the document and cropping parameters associated with blocks 400 and 402, system controller 54 of FIG. 2, retrieves the document description and cropping parameters from system memory 56 and calculates the image cropping area, block 404, as previously described. Upon completion of the processing step at block 404, the system controller will have determined the active image scanning regions (D-E, F-G) for input document 330.

After determining the image cropping area, the system controller awaits an indication that the document has been registered on the platen, test block 406. The affirmative response for the Start Scan test may come from one of two sources. First, in the open platen scanning mode, where a user may be scanning a bound original document, the affirmative response would be caused by the user depressing Start Scan button 162 of FIG. 7. Second, in SADH mode, the affirmative response may also be generated by the successful feeding and center registration of a single document sheet from document entry slot 46 of FIG. 3, whereby the feeding operation is initiated by the user depressing the Start Scan button. Subsequently, processor 25 of FIG. 2 executes test block 408, to determine if side A of document 330 has been selected for imaging. If so, array 24 of FIG. 3 is indexed to position D, the outer cropping limit, where capture of line like segments or rasters of the document image is begun, block 410, and the array continues capturing image rasters as it moves towards position E.

Upon reaching position E, array 24 of FIG. 7 will have captured the image data from the cropping area programmed by the user and further image data capture will be disabled. If image capture for side A has been completed, or if side A has not been selected, test block 408, the scan array indexes to a location between positions E and F of FIG. 14. Next, the system controller tests to determine if side B has been selected for imaging, test block 412. If so, the array moves to position F where it begins capturing raster information associated with side B and once again, image data is captured over the entire cropping region from position F through position G, block 414. Upon completing the image capture, the array is indexed to a location beyond position G. Subsequently, scanning processor 25 reverses the scanning direction of the array and sets a flag bit in an image status message sent to system controller 7, indicating that subsequent image rasters will be transmitted to image compressor/processor 51 in reverse order, block 416. Then, the system controller awaits an indication that the job has been completed, test block 418. As an example, the indication may come from the user selecting Stop Scan button 166 of FIG. 7, which would cause the completion of the scanning job, block 434. Alternatively, the user may turn the page of the input document, re-register it and select Start Scan, or feed another sheet in SADH mode as previously described. Either of these two operations would provide an indication that the job has not been completed, test block 418, in addition to indicating that the user desires to start the scanning operation, test block 420.

Once the system has received an indication that the original document is properly registered, test block 420, a test is again run to determine if side B should be imaged, test block 422. If so, the array moves in a reverse, or left-to-right, direction back towards position G, where it again begins capturing image data, block 424, in the reversed orientation. Upon completing the image capture operation at point F, or if side B imaging is not selected, the array indexes to a location between positions F and E. Subsequently, test block 426 determines if side A is to be scanned, and if so, the image capture operation, block 428, is begun as the array moves past position E. In a similar fashion, the image for side A is captured through position D, at which point the scan array is indexed to a home location beyond position D, under the right-most edge of platen 20. Upon returning to the home location, the scanning direction is again reversed and the image reversal flag bit is cleared, block 430. Subsequently, test block 432 is entered, awaiting a positive affirmation of the end of the scanning job and completion of the job at block 434. In the event that a subsequent start scan command is indicated, processing would continue as previously described at block 406. In general, the looping process illustrated in FIGS. 8A and 8B delineates a complete scan cycle, forward scan and reverse scan, which is employed in accordance with the prevent invention to eliminate interdocument idle time associated with scanner section 6.

The system, utilizing the apparatus and methods of the present invention as described herein, is capable of capturing signature-type original images at an increased rate by utilizing the full scanning range and bi-directional image capture capability of the scanning system. In addition, the scanning section utilizes a center registration mode for signature-type documents, thereby enabling rapid registration of the document on the imaging platen by either the user, in open platen mode, or by the document handler in SADH mode. Furthermore, the system presents the feature selections associated with the signature scanning mode in an organized, easily understandable iconic representation, enabling a user to rapidly program the features desired.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. In a high speed electronic printing system having a scanner section, a platen, a user interface suitable for programming dimensional information defining a desired imaging area of an input document page and a reciprocating scanning device for scanning the document page or pages located on the platen to generate electrical signals representative of the input document, a method of scanning a first page pair, consisting of pages A and B of a signature-type document, and a second page pair, consisting of pages A' and B' of the signature-type document, in a single scan cycle, including the steps of:
   a) programming characteristics of the input document to define the desired imaging area of the signature-type document (A,B) to be imaged, whereby the characteristics comprise:
      i) a cropping offset,
      ii) a cropping distance, and
      iii) a page size;
   b) locating the first page pair of the signature-type document, consisting of pages A and B, on the platen for scanning;
   c) using the characteristics programmed in step a, scanning page A in a first direction through said crop distance;
   d) using the characteristics programmed in step a, scanning page B in said first direction through said crop distance;
   e) replacing the first signature-type document on the platen with the second page pair of the signature-type document consisting of pages A' and B';
   f) reversing the scan direction of the reciprocating scanning device;
   g) scanning page B' in a direction opposite the first direction through said crop distance; and
   h) scanning page A' in said opposite direction through said crop distance.

2. The method of claim 1 further including the step of storing the electrical signals generated by the reciprocating scanning device in memory.

3. The method of claim 2 further including the step of compressing the electrical signals generated by the reciprocating scanning device prior to storage, so as to require less memory for storage of the electrical signals.

4. A high speed electronic imaging system having a scanner section, a platen, a user interface suitable for programming dimensional information defining a desired imaging area of an input document and a reciprocating scanning device for scanning a page or pages of the input document located on the platen, comprising:
   programming means for programming a cropping offset, cropping distance, and page size to define the desired imaging area of each page (A,B) of a signature-type document;
   means for locating said signature-type document on the platen for scanning;
   means, moving in a first direction, for scanning said A page to generate electrical signals representative of the imaging area of page A;
   means, continuing to move in the first direction, for scanning said B page to generate electrical signals representative of the of imaging area of page B.

5. The apparatus of claim 4, wherein said signature-type document comprises a plurality of pages bound together on a common edge, so as to resemble a book.

6. The apparatus of claim 4, further comprising:
- means for locating a second signature-type document on the platen for scanning;
- means, moving in a direction opposite the first direction, for scanning the B page of said second signature-type document to generate electrical signals representative of the imaging area of page B; and
- means, continuing to move in the opposite direction, for scanning the A page of said second signature-type document to generate electrical signals representative of the imaging area of page A.

7. The apparatus of claim 4, wherein said signature-type document is a single sheet signature unit.

8. The apparatus of claim 7, wherein said means for locating said signature-type document on the platen comprises:
- means for receiving a single document sheet;
- means for determining a center location of said document sheet;
- means for automatically transporting said document sheet to said platen; and
- means for automatically positioning said document sheet so that the center location of said document sheet is aligned with a center registration position on said platen.

9. A high speed electronic imaging system comprising:
- a scanner section;
- a platen;
- a user interface suitable for programming dimensional information defining desired imaging areas of an input document, including a cropping offset, cropping distance, and page size to define the desired imaging area of each page (A,B) of a signature-type input document, and wherein said user interface further comprises:
  - a video display;
  - means for specifying a signature-type of the input document;
  - means for specifying which sides of the input document are to be imaged;
  - means for specifying the image area to be cropped from the input document; and
  - means for indicating the size of a gutter region between the A and B pages of the input document;
- means for locating said signature-type document on the platen for scanning, said signature-type document comprising a plurality of pages bound together on a common edge, so as to resemble a book;
- means for scanning said A page through said crop distance in a first direction; and
- means for scanning said B page through said crop distance in the first direction.

10. An electronic imaging system having a scanner section, a platen, and a reciprocating scanning device for scanning an input document located on the platen to generate image signals representative of the input document, comprising:
- means for scanning a first input document in a first direction to generate image signals representative of an image thereon;
- means for outputting image signals associated with scanning the first document in said first direction, whereby said image signals are oriented in a first orientation;
- means for reversing the direction of travel of said reciprocating scanning device;
- means for scanning a second input document in said reverse direction to generate image signals representative of an image thereon;
- means for outputting image signals associated with scanning the second document in said reverse direction, whereby said image signals are oriented in a reversed orientation; and
- an electronic signal for indicating the orientation of the image signals being output by said system.

11. In an electronic imaging system having a scanner section, a platen, and a reciprocating scanning device for scanning a signature-type input document located on the platen to generate image signals representative of the input document, said signature type input document having an A page and a B page on the face thereof, a method of scanning a pair of signature-type input documents in a single scanning cycle, comprising the steps of:
- locating a first signature-type input document on said platen;
- scanning a first image region associated with said A page in a first direction to generate image signals representative of said A page;
- scanning a second image region associated with said B page in said first direction to generate image signals representative of said B page;
- reversing the direction of said reciprocating scanning device;
- locating a second signature-type input document on said platen;
- scanning the second image region associated with said B page in said reverse direction to generate image signals representative of said B page of the second signature-type input document; and
- scanning the first image region associated with said A page in said reverse direction to generate image signals representative of said A page of the second signature-type input document, thereby completing said single cycle with said reciprocating scanning device.

12. An electronic imaging system having a scanner section, a platen, and a reciprocating scanning device for scanning an input document located on the platen to generate image signals representative of the input document, comprising:
- means for scanning a first input document in a first direction to generate image signals representative of an image thereon, wherein said first input document is a signature-type document having an A and a B page on a single face thereof, and wherein said means for scanning a first input document in a first direction further includes:
  - means for scanning only a predefined image region associated with said A page in said first direction; and
  - means for subsequently scanning only a predefined image region associated with said B page in said first direction;
- means for outputting image signals associated with scanning the first document in said first direction, whereby said image signals are oriented in a first orientation;
- means for reversing the direction of travel of said reciprocating scanning device;

means for scanning a second input document in said reverse direction to generate image signals representative of an image thereon;

means for outputting image signals associated with scanning the second document in said reverse direction, whereby said image signals are oriented in a reversed orientation; and an electronic signal for indicating the orientation of the image signals being output by said system.

13. The electronic imaging system of claim 12, wherein said second input document is a signature-type document having an A' and a B' page on a single face thereof, and wherein said means for scanning a second input document in a second direction further comprises:

means for scanning only a predefined image region associated with said B' page in said second direction; and means for subsequently scanning only a predefined image region associated with said A' page in said second direction.

* * * * *